United States Patent
Mandel et al.

(10) Patent No.: US 11,934,828 B1
(45) Date of Patent: Mar. 19, 2024

(54) PERFORMANCE MANAGEMENT FOR ACCESSING STORED ENTITIES BY MULTIPLE COMPUTE NODES OF A STORAGE SYSTEM

(71) Applicant: VAST DATA LTD., Tel Aviv (IL)

(72) Inventors: Ron Mandel, Tel Aviv (IL); Mirit Shalem, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 2 days.

(21) Appl. No.: 18/059,981

(22) Filed: Nov. 29, 2022

(51) Int. Cl.
*G06F 9/30* (2018.01)
*G06F 9/54* (2006.01)

(52) U.S. Cl.
CPC ............ *G06F 9/3004* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 11,329,898 | B2 * | 5/2022 | Guim Bernat | H04L 41/5025 |
| 11,537,616 | B1 * | 12/2022 | Lin | G06N 20/00 |
| 2008/0184214 | A1 * | 7/2008 | Archer | G06F 11/3404 717/155 |
| 2009/0300399 | A1 * | 12/2009 | Archer | G06F 11/3409 709/224 |
| 2013/0042088 | A1 * | 2/2013 | Archer | G06F 11/3447 712/30 |
| 2014/0282429 | A1 * | 9/2014 | Archer | G06F 11/3072 717/130 |
| 2021/0223963 | A1 * | 7/2021 | Ferreira | G06F 3/067 |

* cited by examiner

Primary Examiner — Eric Coleman
(74) Attorney, Agent, or Firm — Reches Patents (57) ABSTRACT

A method for accessing stored entities (SEs) that are stored in a storage unit of a storage system, the method may include determining in a cyclic manner, by each compute node (CN) of a group of compute nodes, CN SEs budgets to be used in a cycle, based on a shared storage space that stores performance requests of Ces of the group.

22 Claims, 4 Drawing Sheets

PERFORMANCE MANAGEMENT FOR ACCESSING STORED ENTITIES BY MULTIPLE COMPUTE NODES OF A STORAGE SYSTEM

BACKGROUND

Storage systems' performance can be evaluated by the ability to digest IO (Input/Output) requests and the size of transferred data that can be digested per time unit. Throughput measures the amount of data that can be transferred to/from the storage system and digested by the storage system per second. IOPS (IO per second) is a measure that represents the number of read and write commands that can be served by the storage system per second.

In a multi-tenant storage system or any other type of multi-user storage system, there is a requirement to avoid cases where tenants can affect each other's performance, and to assign guaranteed performance, which is a fraction of the total performance capabilities of the system, to different storage entities related to different tenants/users.

When multiple compute nodes of the storage system can receive IO requests directed to the same storage entity (or directed to storage entities related to the same tenant or user), there is a requirement to control the IOPS and throughput, produced by accesses of each of the compute nodes, when being directed to the same storage entity. Particularly, there is a requirement for an efficient control of the IOPS and throughput produced by accesses of each of the compute nodes, without wasting network resources and compute resources for enabling the controlling.

SUMMARY

There is provided a method for accessing stored entities (SEs) that are stored in a storage unit of a storage system, the method includes: (i) determining, by a compute node (CN) of the storage system, CN current performance requirements (PRs) of the SEs; wherein the SEs are associated with performance policies; wherein the CN PRs of the SEs are related to accessing the SEs during a current access cycle (CAC); (ii) accessing, by the CN, a shared storage space that stores total current PRs values of the SEs, the total current PRs values are indicative of performance requirements of a group of CNs that request access to the SEs during the CAC; wherein the shared storage space is accessible by the group of CNs; (iii) updating the total current PRs values of the SEs to reflect a contribution of the CN current PRs; wherein a total current PR value of a SE is independently updated by different CNs of the group of CNs, the different CNs request access to the SE during the CAC; (iv) calculating, by the CN, CN current SEs budgets to be used by the CN during the CAC, wherein the calculating is based on one or more CN performance limitations, the total current PRs values and the performance policies; and (v) accessing at least one of the SEs, by the CN, during the CAC, and using the CN current SEs budgets.

There is provided a non-transitory computer readable medium for accessing stored entities (SEs) that are stored in a storage unit of a storage system, the non-transitory computer readable medium stores instructions for: (i) determining, by a compute node (CN) of the storage system, CN current performance requirements (PRs) of the SEs; wherein the SEs are associated with performance policies; wherein the CN PRs of the SEs are related to accessing the SEs during a current access cycle (CAC); (ii) accessing, by the CN, a shared storage space that stores total current PRs values of the SEs, the total current PRs values are indicative of performance requirements of a group of CNs that request access to the SEs during the CAC; wherein the shared storage space is accessible by the group of CNs; (iii) updating the total current PRs values of the SEs to reflect a contribution of the CN current PRs; wherein a total current PR value of a SE is independently updated by different CNs of the group of CNs, the different CNs request access to the SE during the CAC; (iv) calculating, by the CN, CN current SEs budgets to be used by the CN during the CAC, wherein the calculating is based on one or more CN performance limitations, the total current PRs values and the performance policies; and (v) accessing at least one of the SEs, by the CN, during the CAC, and using the CN current SEs budgets.

There is provided a compute node (CN) of a storage system, the compute node comprises one or more circuits that are configured to: (i) determine CN current performance requirements (PRs) of stored entities (SEs) that are stored in a storage unit of a storage system; wherein the SEs are associated with performance policies; wherein the CN PRs of the SEs are related to accessing the SEs during a current access cycle (CAC); (ii) access a shared storage space that stores total current PRs values of the SEs, the total current PRs values are indicative of performance requirements of a group of CNs that request access to the SEs during the CAC; wherein the shared storage space is accessible by the group of CNs; (iii) update the total current PRs values of the SEs to reflect a contribution of the CN current PRs; wherein a total current PR value of a SE is independently updated by different CNs of the group of CNs, the different CNs request access to the SE during the CAC; (iv) calculate CN current SEs budgets to be used by the CN during the CAC, wherein the calculating is based on one or more CN performance limitations, the total current PRs values and the performance policies; and (v) access at least one of the SEs, by the CN, during the CAC, and using the CN current SEs budgets.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a method, system and non-transitory computer readable medium for controlling access to storage entities (SEs) by compute nodes (CNs) during access cycles, wherein each CN may control its access using content stores in a shared memory space. The content represents performance requirements of various CNs related to accessing the SEs during the access cycles. The CNs may update the content regarding their performance requirements independently from each other. The usage of the shared memory space dramatically reduces access related communication and also does not require synchronization. The access may also be determined based on performance policies related to the SEs. The access may also be determined based on CNs limitations.

A storage system may store multitude SEs that may be assigned, by users of the storage system, with access performance policies, related to performance measures involved by IO requests towards the SEs. A SE may be a filesystem, a file, an object, a directory, a filesystem subtree, or all/some of the files, directories, objects that are related to (and can be accessed by) a certain tenant, related to a certain filesystem-protocol user, etc. The access performance measures may be IOPS (IOs per second) and throughput (the amount of data that can be directed to/received from a SE per second), and each (of IOPS, throughput) may be related to writes, reads or both.

The access performance policies include performance limits on the access towards the SEs, which may be for example: maximum—i.e., the maximum allowed read or write IOPS (or throughput) directed to the SE, a minimum guaranteed performance—i.e., the minimum read or write IOPS (or throughput) that can be performed by a user on a SE, that is guaranteed to a user, and further may serve as a limit above which the user is charged with extra cost.

The storage system of the present invention includes multiple compute nodes (CNs), where all the CNs may access the same SEs stored in one or more storage nodes that are accessible by all the CNs, wherein the SEs are assigned with performance limits. There is a need to ensure that the access towards an SE does not violate its performance limits (exceed a maximum limit or drop below a minimum performance limit), even when being accessed by multiple CNs of the storage system.

Orchestrating multiple CNs that access the same limited accessed SEs may be a complicated process requiring a central machine that performs the orchestration, causing a bottleneck that further causes latencies. Even when a central machine does not exist, having the multiple CNs need to communicate with each other for managing the shared performance limits that need to be complied by the multiple CNs, as if it was a single accessing entity—requires communication burden that may cause latencies.

According to embodiments of the invention, the compliance with the defined performance—limits are handled without needing a central orchestrating entity and without needing to communicate among the different CNs that need to access the same SE. Instead, the CNs access global shared values that are accessible to all the CNs, and include, per each limited accessed SE, and per each defined performance parameter (e.g., read IOPS, write IOPS, read throughput, write throughput), information about the total performance requirements of all the CNs, which is the sum of all performance requirements reported by the CNs for accessing the SE in the current time interval (also referred to as current access cycle), where the global shared value is independently updated by the CNs, without needing to synchronize the updates of the shared global value, i.e., each CN updates the shared global value independently, according to its internal clock, regardless of the timing of updates by other CNs. The value of the total performance requirements facilitates determining, by each compute entity (CN) and independently from each other, its performance budget for each SE that is assigned with performance limits, during the current time interval.

The global shared values for controlling the accesses towards the various SEs, by the multiple CNs, are stored in a shared storage space that is accessible by all the CNs. Each SE is assigned with one or more shared values for summing the current performance requirements from all the CNs for accessing the SE.

Figure 1:
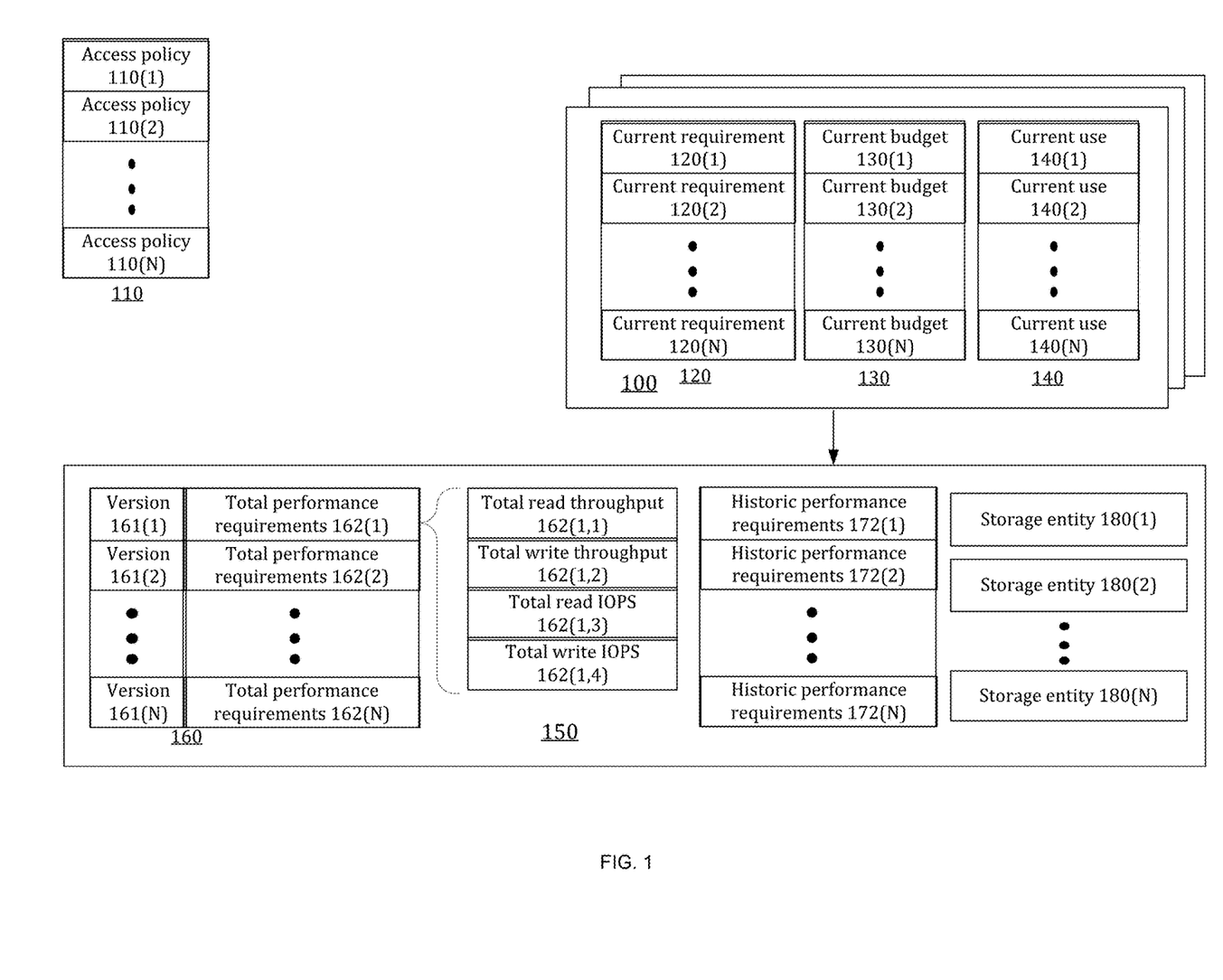
FIG. 1 is an example of content stored in a compute node, content stored in a shared memory space and access policies.
Figure 4:
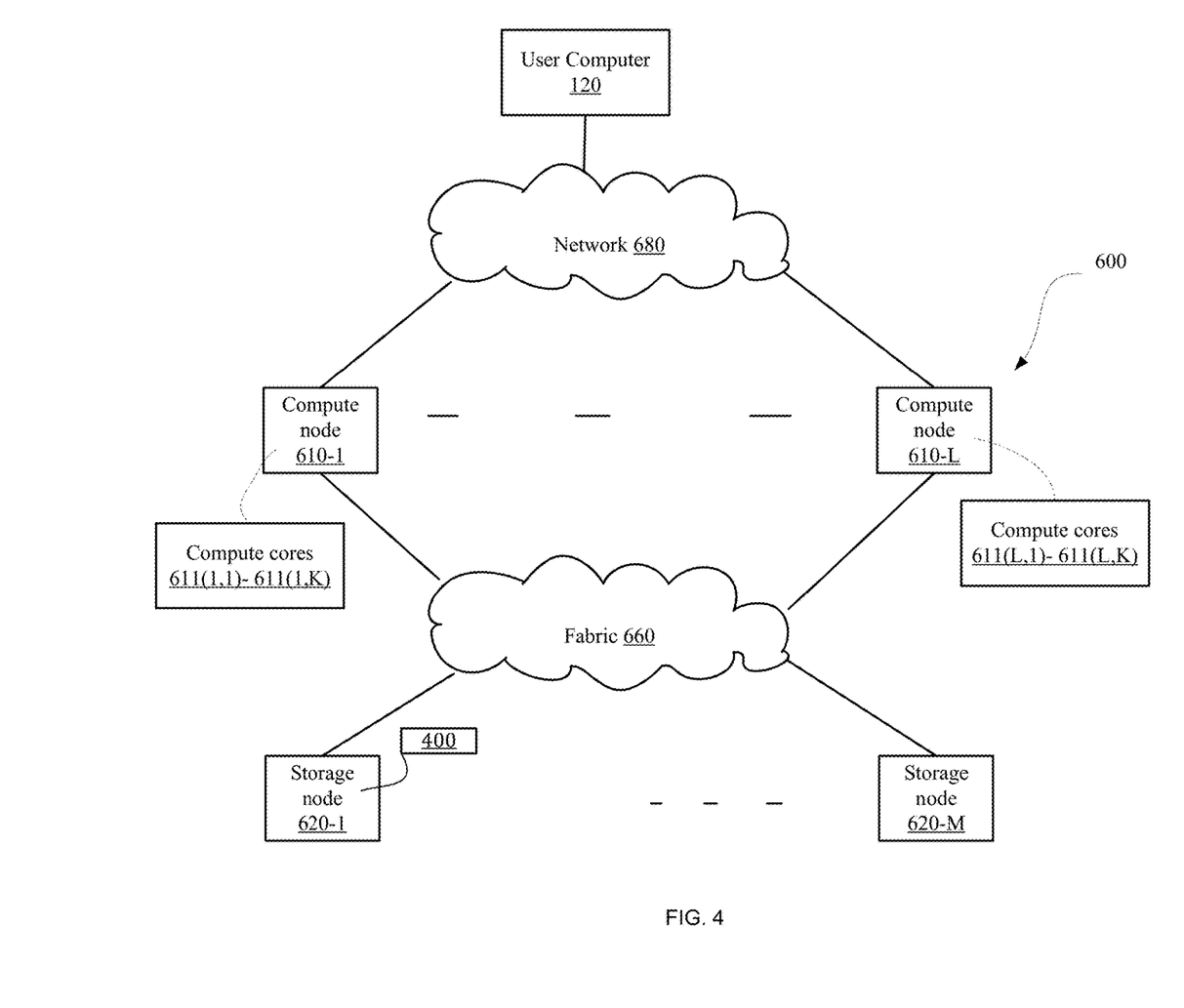
FIG. 4 is an example of a storage system.

FIG. 1 illustrates a shared storage space 150 that may be part of one or more storage nodes of FIG. 4.

Shared storage space 150 stores N SEs 180(1)-180(N) assigned with access policies 110 defining values of limited performance. Shared storage space 150 further includes N shared values 160, each SE is assigned with one of the shared global values. Each value includes one or more values summing the total performance requirements from all the CNs, such as total performance requirements 162(1)-162(N). For example, the values included in total performance requirements 162(1) of the first SE may include: total read throughput 162(1,1), total write throughput 162(1,2), total read IOPS 162(1,3), and total write IOPS 162(1,4).

Each CN calculates or obtains its performance requirements towards the various SEs, periodically, taking into account, at least: (i) the characteristics of IOs that were received by the CN in one or more previous cycles, such as the number of IO requests per time unit and the total size of the IO requests. IO requests that were throttled because of exhaustion of the budget in one or more previous cycles may increase the performance requirement for the current cycle, as these IO requests need to be handled in the current cycle in addition to IO requests that will be received during the current cycle; (ii) the performance requirements should be at least the defined minimum for the CN, i.e., the largest value between the value calculated in (i) and the defined minimum for the CN; (iii) the CN performance limitations is taken into consideration, i.e., total throughput or IOPS that the CN is capable to digest and transmit towards the storage nodes.

The CN performance limitations should be divided among the accessed SEs in a fair manner (or in any other manner), based on the performance requirements calculated per each SE, for accessing the SE by the CN. Therefore, once all the performance requirements are calculated for all the SEs accessed by the CN, if the total of the performance requirements (of the CN for accessing the SEs) exceeds the CN performance limitations, each of the SE performance requirements is adjusted according to its share in the total performance requirements towards all the SEs accessed by the CN. The adjusting includes multiplying the CN performance limitation by the relationship between the performance requirement determined so far for accessing a certain SE by the CN (according to (i) and (ii)) and the total performance requirements calculated for all the SEs accessed by the CN. For example, the performance requirement for a specific SE is adjusted as follows:

<CN performance limit>*[<SE performance requirement by CN>/<sum of all SEs performance requirements by CN>].

The defined minimum for the CN for accessing a certain SE is based on the minimum performance defined by the performance policy of the SE, and the relationship between the SE performance requirement calculated by the CN and the sum of the SE performance requirements from all the CNs accessing the SE.

Figure 2:
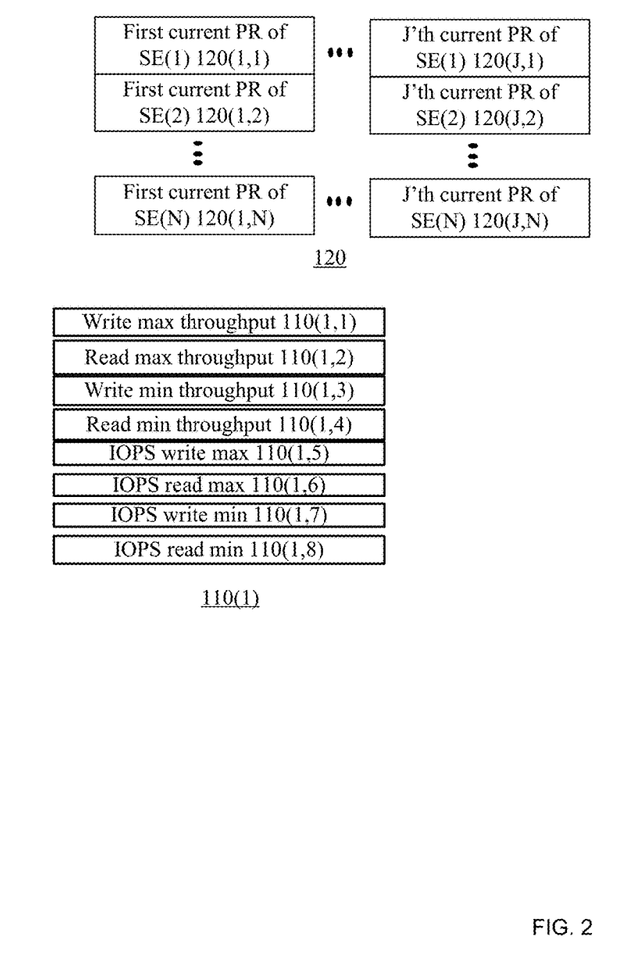
FIG. 2 is an example of a content.

FIG. 1 further illustrates one CN 100 of multiple CNs of the storage system, that stores N values of current performance requirement 120(1)-120(N) that include the performance requirement for each of the N SEs, during the current time interval, as calculated by the CN. A current performance requirement may include one or more fields—for example read throughput, write throughput, read IOPS, write IOPS and the like. FIG. 2 illustrates current performance requirements of SE(1) as including J different current performance requirements—such as first current PR of SE(1) till first current PR of SE(N) 120(1,1)-120(1,N) till J'th current PR of SE(1) till J'th current PR of SE(N) 120(J,1)-120(J,N).

The performance requirements for the current time interval are updated in the shared values 160, e.g., added to the sums stored in the shared values. Each update of the current time interval performance requirements includes directly accessing the shared value of a certain SE for updating the shared value with the difference between the performance requirement calculated by the CN at a previous time interval (that was updated in the shared value in the previous time interval) and the performance requirement of the current time interval. The update, by the CN, of the total performance requirements stored in the shared value conforms to:

<total performance requirements>=<total performance requirements>+<CN current performance requirement>-<CN previous performance requirement>

After the CN updates the shared value with the current CN performance requirement, it calculates its performance budget for the current time interval using the value of the shared value after being updated by the CN, by: reading the updated value of the shared value, and calculating the relationship between the current CN performance requirement and the value of the total performance requirements of the shared value, that reflects a summation of performance requirements from all the CNs. The CN calculates its own performance budget for the SE, by multiplying the maximum performance limit of the SE, by the relationship between the current CN performance requirement for the SE and the value of the total performance requirements (gathered from all the CNs) of the shared value of the SE. The CN performance budget towards the SE is:

<SE performance limit>*<CN current performance requirement for the SE>/<total performance requirements of all CNs>. The performance budget may be adjusted according to the CN performance limitations, as described above for adjusting the performance requirements, and may replace the adjustment of the performance requirements. If the performance budget results in a value that is smaller than the defined CN minimum for accessing the SE—then the performance budget is set to the CN minimum for accessing the SE. The defined CN minimum for accessing a certain SE is based on the minimum performance defined by the performance policy of the SE, and the relationship between the SE performance requirement calculated by the CN and the sum of the SE performance requirements from all the CNs accessing the SE. The forcing of the minimum requirement may be performed either on the budget or the requirement.

The CN stores its performance budget per each SE in its internal memory, and controls its accesses towards each SE, during the current time interval, by consulting only the performance budget in its internal memory, without needing to access the shared value (that involves a slower access given that the shared value is stored in a different node) until the next cycle.

FIG. 1 illustrates the current performance requirement 120(1)-120(N), stored in the internal memory of the CN, and calculated by the CN for the N SEs at the current time interval.

FIG. 1 further illustrates N values of access policy 110(1)-110(N) (also referred to as performance policy), each access policy is obtained from a user and defines the policy of one SE. The access policies may be stored within the CN, or stored in a shared memory space such as 150—or otherwise may be accessible by any of the CNs. Each access policy may include one or more values for defining various performance limits. FIG. 2 illustrates examples of access policies. See, for example, access policy 110(1) that includes the values: write max throughput 110(1,1), read max throughput 110(1,2), write min throughput 110(1,3), read min throughput 110(1,4), IOPS write max 110(1,5), IOPS read max 110(1,6), IOPS write min 110(1,7) and IOPS write min 110(1,8). Access policy 110(1)-110(N) are obtained from the users and may be distributed to all the CNs to be cached in their internal memories.

FIG. 1 further illustrates the values for the current performance budget 130(1)-130(N) that were calculated by the CN for the current time interval, for each SE, by using the values of total performance requirements 162.

Upon receiving an IO request at a CN, the CN determines the identity of the addressed SE, checks the consumption of the performance towards the addressed SE, during the current time interval. FIG. 1 illustrates current use 140(1)-140(N) that includes the summation of the performance parameters that were consumed during the current time interval. If the performance consumption does not exceed the current performance budget for that SE, the IO request is handled. Otherwise, the IO request is delayed until the next cycle, and may cause increase of the CN requirement for that SE, in the next cycle.

The CN accesses the shared value of each accessed entity, at most once in a time interval, and only if it receives an access request during that time interval. Therefore, each current performance budget is associated with a timestamp indicative of the time interval when it was updated. When an access request is received by the CN, the CN checks the timestamp of the corresponding performance budget (the budget related to the SE addressed by the access request), and if the timestamp is older than the current time interval—an access is done towards the corresponding shared value, for updating the value with the performance requirements for the new time interval and for calculating a new budget for the SE accessed by the CN.

In order to cope with failures of CNs that cause the value to sum irrelevant performance requirements of failed CNs, each shared value is associated with a version. For example, each of the N values of FIG. 1 is associated with one of the versions 161(1)-161(N). The version is updated every time period that is longer than the length of the time intervals of updating budgets. When the version is updated, the values of the total performance requirements are reset to zero, so as to clean up irrelevant performance requirements of failed CNs. When a CN accesses a shared value, it also checks its version, if the version is different from the version known to the CN, then instead of updating the shared value with the requirement difference (the change since the previous time interval), it updates the shared value with the absolute value of its requirement, without deducting the previous requirement. The length of the time intervals of updating budgets may be for example 100 msecs, while the time between updating the performance requirements' versions may be 60 seconds.

Since the shared value does not reflect the accurate value of the total performance requirements during one or more time-intervals that follow the value reset (since not all the CNs may already updated their performance requirements), then values of historic performance requirement 172(1)-172(N) are temporarily used instead for calculating budgets.

Each historic performance requirement includes a moving average of the performance requirement over multiple previous time intervals.

Figure 3:
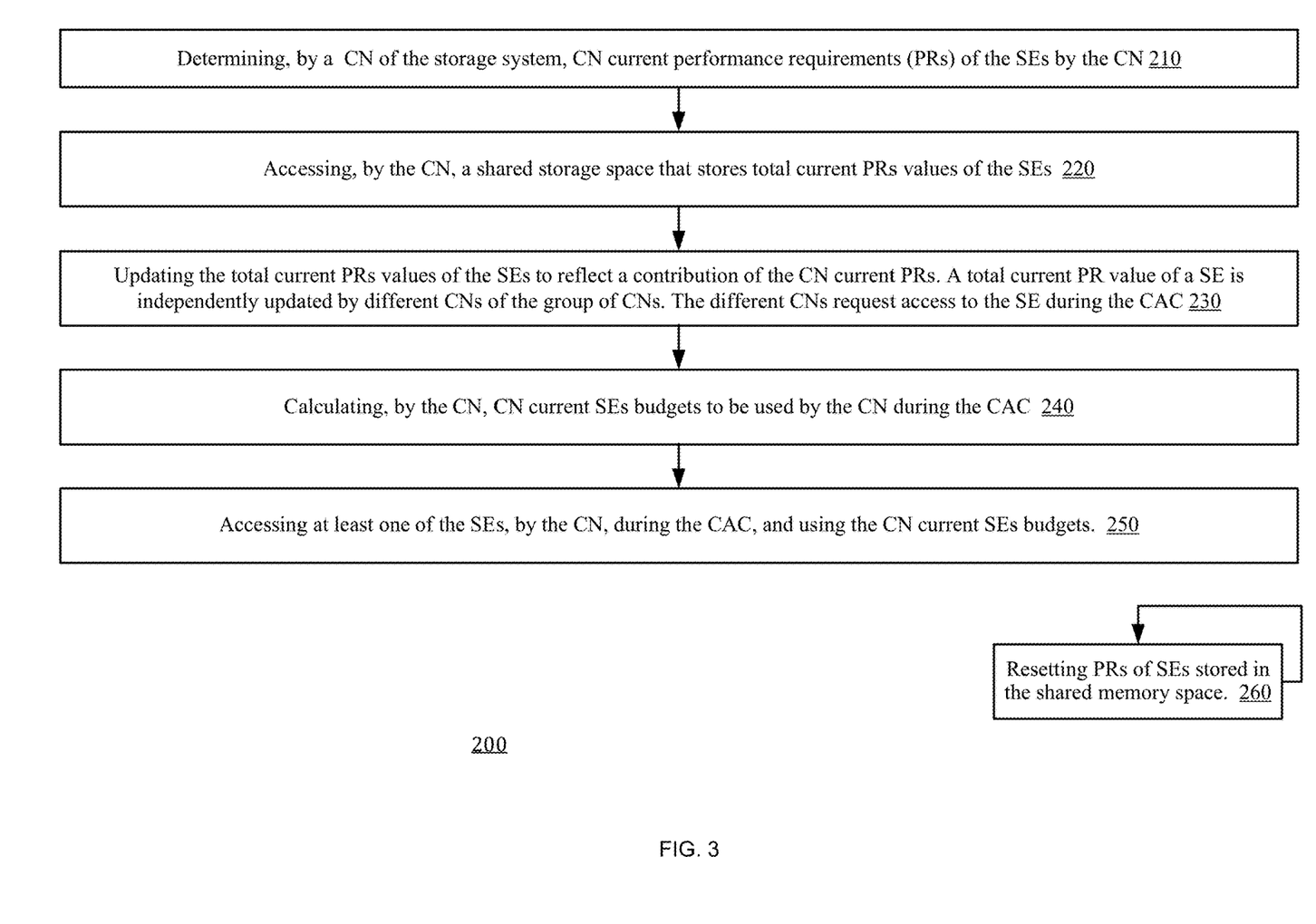
FIG. 3 is an example of a method.

FIG. 3 illustrates an example for method 200 for accessing stored entities (SEs) that are stored in a storage unit of a storage system. The storage unit may be a storage node.

Method 200 may be executed, independently, by each compute node (CN) of a group of CNs that access the shared memory space.

Method 200 may be executed by any compute node of a group of compute nodes that share a shared storage space that will be further discussed in the following pages.

Method 200 may start by step 210 of determining, by a CN of the storage system, CN current performance requirements (PRs) of the SEs by the CN.

The SEs are associated with performance policies.

The CN PRs are related to accessing the SEs by the CN during a current access cycle (CAC).

Step 210 may be followed by step 220 of accessing, by the CN, a shared storage space that stores total current PRs values of the SEs (denoted "total performance requirements" in FIG. 1). The total current PRs values are indicative of performance requirements of a group of CNs that request access to the SEs during the CAC.

The shared storage space is accessible by the group of CNs.

Step 220 may be followed by step 230 of updating the total current PRs values of the SEs to reflect a contribution of the CN current PRs. A total current PR value of a SE is independently updated by different CNs of the group of CNs. The different CNs request access to the SE during the CAC.

Step 230 may include at least one out of:
a. Updating the total current PR of the SE by a difference between a CN previous PR of the SE and the CN current PR of the SE. For example—if the CN previous PR of the SE had a first value (V1) and the CN current PR of the SE has a second value (V2), than the difference (V2−V1) may be used for updating the total current PR of the SE: <total current PR of the SE>=<total current PR of the SE>+(V2−V1).
b. Updating the total current PR of the SE by the CN current PR of the SE. For example—assuming that the CN current PR of the SE has a second value (V2) then <total current PR of the SE>=<total current PR of the SE>+(V2).

Option (a) may be selected when a previous total PR value of the SE was not reset since a last access cycle that preceded the CAC.

Option (b) may be selected when a previous total PR value of the SE was reset since a last access cycle that preceded the CAC.

The reset may be done in order to reset contributions of CNs that are not active or do not access various SEs, and particularly—CNs that became non-operational and cannot update the total PR value. The occurrence of a reset may be determined by the CN according to an incremented version of the total PR value.

Step 230 may be followed by step 240 of calculating, by the CN, CN current SEs budgets to be used by the CN during the CAC. The calculating is based on one or more CN performance limitations, the total current PRs values and the performance policies.

Examples of CN current PRs and/or performance policies are illustrated above and/or in FIG. 1 and/or FIG. 2. For example—a CN current PR may be related to an access throughput limit and/or a number of access operations per time unit limit. Yet for another example—a performance policy may be an access throughput limit (for example minimum and/or maximum) and/or a number of access operations per second limit (for example minimum and/or maximum). When a reset of the total PR values is detected—there may be a need to use alternative shared content—such as historic total PRs values (see, for example, historic performance requirements of FIG. 1) for calculating the budget, instead of using the total PR value.

Step 240 may include calculating of a CN current SE budget of the SE. The SE may be any one of the SEs.

The calculating of the CN current SE budget of the SE may include (i) determining an initial CN current SE budget of the SE based on a relationship between a CN current PR of the SE and the total current PR value of the SE; and (ii) determining the CN current SE budget of the SE based on the initial CN current SE budget of the SE and one or more CN limitations. The CN limitations may be related to performance limitations, such as the maximum throughput or maximum IOPS that the CN is capable of producing towards all the SEs handled by the CN.

The determining of the initial CN current SE budget of the SE may include applying a first function. The first function may be any function that calculates the share of the CN current PR of the SE out of the total current PR value of the SE, and may be based on a SE maximum performance limitation defined in the performance policy of the SE and the relationship between the CN current PR of the SE and the total current PR value of the SE.

The determining of the CN current SE budget of the SE may include applying a second function. The second function may be related to at least one of: performance limitation of the CN and a SE minimum performance limitation as defined in its performance policy. The second function related to the performance limitation of the CN may be based on the performance limitation of the CN (e.g., maximum throughput capability) and the relationship between the CN current PR of the SE and the CN current PRs of all the SEs accessed by the CN. This function may be applied when the total sum of the initial CN current SE budgets towards all the SEs accessed by the CN is higher than the performance limitation of the CN. The second function may be related to an SE minimum performance limitation is applied when the initial CN current SE budget of the SE is lower than the CN minimum performance limitation of the SE. This function may be based on the minimum performance limitation of the SE as defined by the access policy, and the relationship between the CN current PR of the SE and the total current PR value of the SE.

The first function may equal the second function or may differ from the second function. The first function and/or the second function may be a linear function, a non-linear function, a priority based function, a priority ignorant function, and the like.

A performance policy of the SE may include a maximal performance limit related to the SE. Step 240 may include determining of a CN current SE budget in a manner that prevents the CN current SE budget from exceeding the maximal performance limit. The maximal performance limit may refer to all the CNs that access the SE—and a CN current SE budget of a single CN should not exceed this maximal performance limit. This may be achieved by the first function that calculates the share of the CN's requirement towards the SE out of the requirements of all the CNs, where the share of each CN is multiplied by the maximal performance limit of the SE.

A performance policy of the SE may include a minimal performance limit related to the SE. Step 240 may include determining of a CN current SE budget while preventing from a total current SE budget of the SE to be below the minimal performance limit related to the SE. The total current SE budget of the SE is the sum of the budgets calculated by all the CNs. This may be achieved by the second function that calculates the share of the CN's requirement towards the SE out of the requirements of all the CNs, where the share of each CN is multiplied by the minimal performance limit of the SE. The CN current SE budget should not be below this calculation.

Step 240 may be followed by step 250 of accessing at least one of the SEs, by the CN, during the CAC, and using the CN current SEs budgets. Step 250 may include accessing each SE of the SEs for which the CN has a CN current SE budget. The using of the CN current SEs budgets is for determining whether the budget is exhausted during the current access cycle and IOs should be throttled.

Method 200 may include step 260 of resetting PRs of SEs stored in the shared memory space. The reset may be executed once per multiple access cycles.

FIG. 4 illustrates an example of a storage system and its environment.

For simplicity of explanation other storage systems are not shown and may have a similar structure.

The storage system 600 includes a number of L compute nodes 610-1 through 610-L (hereinafter referred to individually as a compute node 610 and collectively as compute nodes 610, merely for simplicity purposes, L is an integer equal to or greater than 1). The compute nodes include (or may execute) multiple compute cores each (for example 611(1,1)-611(1,K) of compute node 610-1 and 611(L,1)-611(L,K) of compute node 610-L).

The storage system 600 also includes a number of M storage nodes 620-1 through 620-M (hereinafter referred to individually as a storage node 620 and collectively as storage nodes 620, merely for simplicity purposes, M is an integer equal to or greater than 1). The computer nodes 610 and the storage nodes 620 are connected through a communication fabric 660. M may equal L or may differ from L. Multiple of the compute nodes and/or one or more compute cores of at least one compute core may execute method 200. The SEs and their total current PRs values are stored in one or more storage nodes 620. Communication fabric 660 is used for reading and updating the total current PRs values by the compute nodes.

In an embodiment, a compute node 610 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 610 does not require any dedicated hardware.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for accessing stored entities (SEs) that are stored in a storage unit of a storage system, the method comprises:
   determining, by a compute node (CN) of the storage system, CN current performance requirements (PRs) of the SEs; wherein the SEs are associated with performance policies; wherein the CN PRs of the SEs are related to accessing the SEs during a current access cycle (CAC);
   accessing, by the CN, a shared storage space that stores total current PRs values of the SEs, the total current PRs values are indicative of performance requirements of a group of CNs that request access to the SEs during the CAC; wherein the shared storage space is accessible by the group of CNs;
   updating the total current PRs values of the SEs to reflect a contribution of the CN current PRs; wherein a total current PR value of a SE is independently updated by different CNs of the group of CNs, the different CNs request access to the SE during the CAC;
   calculating, by the CN, CN current SEs budgets to be used by the CN during the CAC, wherein the calculating is based on one or more CN performance limitations, the total current PRs values and the performance policies; and
   accessing at least one of the SEs, by the CN, during the CAC, and using the CN current SEs budgets.

2. The method according to claim 1, wherein at least one CN current PR and at least one performance policy are selected out of an access throughput limit and a number of access operations per time unit limit.

3. The method according to claim 1, wherein a performance policy is selected out of an access throughput limit and a number of access operations per second limit.

4. The method according to claim 1, wherein the calculating of the CN current SEs budgets comprises calculating of a CN current SE budget of the SE, wherein the calculating of the CN current SE budget of the SE comprises:
   determining an initial CN current SE budget of the SE based on a relationship between a CN current PR of the SE and the total current PR value of the SE; and
   determining the CN current SE budget of the SE based on the initial CN current SE budget of the SE and one or more CN limitations.

5. The method according to claim 4, wherein the determining of the initial CN current SE budget of the SE comprises applying a first function, and wherein the determining of the CN current SE budget of the SE comprises applying a second function.

6. The method according to claim 5, wherein the first function equals the second function.

7. The method according to claim 5, wherein the first function differs from the second function.

8. The method according to claim 1, wherein an updating of a total current PR value of the SE comprises updating the total current PR of the SE by a difference between a CN previous PR of the SE and the CN current PR of the SE.

9. The method according to claim 1, comprising, checking, by the CN, whether a previous total PR value of the SE was reset since a last access cycle that preceded the CAC.

10. The method according to claim 9, comprising calculating, by the CN, a CN current SE budget to be used by the CN during the CAC, wherein the calculating is based on CN performance limitations, historic total PRs values and a performance policy related to the SE when the previous total PR value of the SE was reset since the last access cycle that preceded the CAC.

11. The method according to claim 9, comprising:
updating the total current PR of the SE by a difference between a CN previous PR of the SE and the CN current PR of the SE, when the previous total PR value of the SE was not reset since the last access cycle that preceded the CAC; and
updating the total current PR of the SE by the CN current PR of the SE, when the previous total PR value of the SE was reset since the last access cycle that preceded the CAC.

12. The method according to claim 1, wherein a performance policy of the SE comprises a maximal performance limit related to the SE, and wherein a determining of a CN current SE budget comprises preventing the CN current SE budget from exceeding the maximal performance limit.

13. The method according to claim 1, wherein a performance policy of the SE comprises a minimal performance limit related to the SE, and wherein a determining of a CN current SE budget comprises preventing from a total current SE budget of the SE to be below the minimal performance limit related to the SE.

14. A non-transitory computer readable medium for accessing stored entities (SEs) that are stored in a storage unit of a storage system, the non-transitory computer readable medium stores instructions for:
determining, by a compute node (CN) of the storage system, CN current performance requirements (PRs) of the SEs; wherein the SEs are associated with performance policies; wherein the CN PRs of the SEs are related to accessing the SEs during a current access cycle (CAC);
accessing, by the CN, a shared storage space that stores total current PRs values of the SEs, the total current PRs values are indicative of performance requirements of a group of CNs that request access to the SEs during the CAC; wherein the shared storage space is accessible by the group of CNs;
updating the total current PRs values of the SEs to reflect a contribution of the CN current PRs; wherein a total current PR value of a SE is independently updated by different CNs of the group of CNs, the different CNs request access to the SE during the CAC;
calculating, by the CN, CN current SEs budgets to be used by the CN during the CAC, wherein the calculating is based on one or more CN performance limitations, the total current PRs values and the performance policies; and
accessing at least one of the SEs, by the CN, during the CAC, and using the CN current SEs budgets.

15. The non-transitory computer readable medium according to claim 14, wherein at least one CN current PR and at least one performance policy are selected out of an access throughput limit and a number of access operations per time unit limit.

16. The non-transitory computer readable medium according to claim 14, wherein a performance policy is selected out of an access throughput limit and a number of access operations per second limit.

17. The non-transitory computer readable medium according to claim 14, wherein the calculating of the CN current SEs budgets comprises calculating of a CN current SE budget of the SE, wherein the calculating of the CN current SE budget of the SE that stores instructions for
determining an initial CN current SE budget of the SE based on a relationship between a CN current PR of the SE and the total current PR value of the SE; and
determining the CN current SE budget of the SE based on the initial CN current SE budget of the SE and one or more CN limitations.

18. The non-transitory computer readable medium according to claim 17, wherein the determining of the initial CN current SE budget of the SE comprises applying a first function, and wherein the determining of the CN current SE budget of the SE comprises applying a second function.

19. The non-transitory computer readable medium according to claim 14, wherein an updating of a total current PR value of the SE comprises updating the total current PR of the SE by a difference between a CN previous PR of the SE and the CN current PR of the SE.

20. The non-transitory computer readable medium according to claim 14, that stores instructions for, checking, by the CN, whether a previous total PR value of the SE was reset since a last access cycle that preceded the CAC.

21. The non-transitory computer readable medium according to claim 20, that stores instructions for calculating, by the CN, a CN current SE budget to be used by the CN during the CAC, wherein the calculating is based on CN performance limitations, historic total PRs values and a performance policy related to the SE when the previous total PR value of the SE was reset since the last access cycle that preceded the CAC.

22. A compute node (CN) of a storage system, the compute node comprises one or more circuits that are configured to:
determine CN current performance requirements (PRs) of stored entities (SEs) that are stored in a storage unit of a storage system; wherein the SEs are associated with performance policies; wherein the CN PRs of the SEs are related to accessing the SEs during a current access cycle (CAC);
access a shared storage space that stores total current PRs values of the SEs, the total current PRs values are indicative of performance requirements of a group of CNs that request access to the SEs during the CAC; wherein the shared storage space is accessible by the group of CNs;
update the total current PRs values of the SEs to reflect a contribution of the CN current PRs; wherein a total current PR value of a SE is independently updated by different CNs of the group of CNs, the different CNs request access to the SE during the CAC;
calculate CN current SEs budgets to be used by the CN during the CAC, wherein the calculating is based on one or more CN performance limitations, the total current PRs values and the performance policies; and access at least one of the SEs, by the CN, during the CAC, and using the CN current SEs budgets.

* * * * *